United States Patent [19]

Schieber

[11] Patent Number: 4,568,533

[45] Date of Patent: Feb. 4, 1986

[54] METHOD OF PROVIDING A FLOWABLE CARBON MATERIAL

[75] Inventor: Franz Schieber, Röthenbach a.d. Pegnitz, Fed. Rep. of Germany

[73] Assignee: C. Conradty Nürnberg GmbH & Co KG, Röthenbach a.d.Pegnitz, Fed. Rep. of Germany

[21] Appl. No.: 624,391

[22] Filed: Jun. 25, 1984

[30] Foreign Application Priority Data

Jul. 1, 1983 [DE]  Fed. Rep. of Germany ....... 3323801

[51] Int. Cl.$^4$ ............................................. C01B 31/02
[52] U.S. Cl. ..................................... 423/448; 252/62; 264/29.1; 264/29.4; 423/445; 423/449
[58] Field of Search ................... 423/447.9, 447.2, 445, 423/448, 449; 264/29.1, 29.4, 29.5; 252/62; 502/180; 201/25

[56] References Cited

U.S. PATENT DOCUMENTS

| | | | |
|---|---|---|---|
| 1,370,728 | 3/1921 | Bradely | 423/449 |
| 1,482,939 | 2/1924 | McIntosh | 423/447.9 |
| 3,107,973 | 10/1963 | Bickerdike et al. | 423/445 |
| 3,914,392 | 10/1975 | Klett | 423/445 |
| 4,226,816 | 10/1980 | Yamamoto et al. | 423/447.9 |

FOREIGN PATENT DOCUMENTS 1031126  5/1966  United Kingdom ................ 423/449

Primary Examiner—Edward J. Meros
Attorney, Agent, or Firm—Parmelee, Bollinger & Bramblett

[57] ABSTRACT

The invention relates to a method of providing a flowable carbon material, in particular for filling hollow spaces for the purpose of heat-insulation. A method of that type is to be laid out in a manner such that it is possible to produce thereby distributable or flowable carbon materials, which are less contaminating, in particular, which develop less dust and may also be manipulated in a simpler manner, with the efforts from the standpoint of procedural technique involved to produce these products are to be, if at all, only insignificantly greater than the efforts required in regard to the above-mentioned products. To this end, it is suggested to impregnate with a binder material paper particles in platelet form having an average diameter of from 0.5 to 5 mm and an average thickness of from 0.01 to 1 mm and/or in strip form having an average length of from 5 to 30 mm, an average width of from 0.5 to 10 mm and an average thickness of from 0.01 to 1 mm, which include an ash content of from 0.005 to 5%, and to carbonize them through a temperature treatment such that they form a flowable heap material having a bulk weight of from 30 to 300 g/l, i.e. 66 to 660 pound/m$^3$.

20 Claims, No Drawings

METHOD OF PROVIDING A FLOWABLE CARBON MATERIAL

BACKGROUND OF THE INVENTION

The invention relates to a method of providing a flowable carbon material, in particular for filling hollow spaces for the purpose of heat insulation.

In cases in which highly porous, light-weight, carbon-containing materials are used to fill out hollow spaces, in particular for the purpose of heat insulation, for example for high-temperature furnaces, felt-like or batt-like, i.e. nonwoven carbonaceous materials have only to a limited extent proved serviceable because they are, due to the fact they are not flowable, not capable of penetrating into particularly narrow hollow spaces of complicated shape without being subsequently pushed in, which involves much effort, and of filling out these hollow spaces such that the intended heat insulation is achieved.

On the other hand, the carbon or graphite materials in granulate form or powder form, which have long been used for the purpose of heat insulation and which have the desired flowability, for example carbon black or coke powder, are disadvantageous insofar as the require substantial work effort upon introduction into the hollow spaces or containers provided for them in order to avoid considerable contamination and dust formation.

DESCRIPTION OF THE INVENTION

It is, therefore, an object of the invention to lay out a method of the mentioned type such that it is possible to produce with said method distributable or flowable carbon materials, which are less contaminating, in particular which develop less dust. It is a further object of the invention to provide a method of the above type to produce flowable carbon materials which can be manipulated in a more simple manner, in which respect the effort from the standpoint of procedural technique involved for producing these carbon materials is, if at all, to then only be insubstantially greater than the effort required in regard to the abovementioned products.

According to the invention, these and other objects are accomplished in that paper particles in platelet form having an average diameter of from 0.5 to 5 mm and an average thickness of 0.01 to 1 mm and/or in strip form having an average length of from 5 to 30 mm, an average width of from 0.5 to 10 mm and an average thickness of from 0.01 to 1 mm, which include an ash content of from 0.005 to 5% by weight, are impregnated with a binder and carbonized through a temperature treatment such that they form a flowable heap material having a bulk weight of from 30 to 300 g/1, i.e. 66 to 660 pound/m$^3$.

Hence, paper particles in platelet form or in strip form, but also in the form of shavings or the like, as the expression "platelet form" as used is intended to comprise all comparable, similar configurations, which by their very nature are distributable or, resp., flowable, are, according to the ivention, treated with a carbonaceous impregnating agent and are thereupon carbonized, so that they retain their capability to be distributed or to flow. Already due to the fact that the particulate carbon material thus provided develops less dust, it can be processed in a substantially simpler way or, resp., can be used as heat insulation, with the extraordinarily low bulk weight thereof likewise providing considerable advantages. Moreover, the starting product consisting of paper may also be a waste product, which is obtained for example in the papermaking industry.

The subclaims characterize advantageous further developments of the process of the invention. For example, carbonaceous liquids may be used as impregnating agents, which provide upon carbonization a carbon residue of from 5 to 50% by weight. Also, there is the possibility to, in cases in which the carbonized or, resp., graphitized particles produced by that method do not correspond to the desired size, subsequently still comminute these particles with per se known comminution apparatus. The grain spectrum resulting therefrom can be split up into the desired fractions by known classification methods. The carbonized paper particles may, after once having been impregnated and carbonized by a temperature treatment, be once again impregnated with the liquid carbonaceous impregnating agent and then again carbonized by a temperature treatment as previously described.

Impregnation of the paper particles takes place, for example, in that these particles are impregnated through immersion with an impregnating agent solution, which may be, for example, a 20%-methanolic phenolformaldehyde resin solution, so that the particulate heap material becomes saturated. Thereafter, the excess impregnating agent solution is removed from the heap material by dripping off or by being squeezed off by means of rollers, presses or the like. A comparatively low amount of the impregnating agent solution thus remains in and on the paper particles, from which the solvent evaporates. The air-dried paper particles are thereafter subjected at approx. 130° C. to a temperature treatment, with condensation of the resin taking place. On account of said latter operation, the paper particles shrink, and on account of that they are released from one another and already in this stage again form a flowable product, which is for the purpose of carbonization subjected to a per se known annealing treatment, which takes place, for example, in an inert atmosphere at temperatures up to 1200° C.

What is claimed is:

1. A method for providing a flowable carbon heap material adapted for filling hollow spaces for the purposes of heat insulation, comprising:
   (1) impregnating a heap of paper particles in platelet form having an average diameter of from 0.5 to 5 mm and an average thickness of from 0.01 to 1 mm or in strip form having an average length of from 5 to 30 mm, an average width of from 0.5 to 10 mm and an average thickness of from 0.01 to 1 mm, and an ash content of from 0.005 to 5% by weight, by immersion in a liquid carbonaceous impregnating agent so that the particulate heap material becomes saturated with impregnating agent,
   (2) removing excess impregnating agent from the particulate heap material, and
   (3) carbonizing the impregnated particulate heap material by temperature treatment such that the impregnated paper particles shrink and produce a flowable heap material of carbonized paper particles having a bulk weight of from 30 to 300 g/1.

2. A method according to claim 1 wherein the temperature treatment comprises graphitization of the impregnated paper particles.

3. A method according to claim 1 wherein the liquid carbonaceous impregnating agent upon carbonization provides a carbon residue of from 5 to 50% by weight.

4. A method according to claim 2 wherein the liquid carbonaceous impregnating agent upon carbonization provides a carbon residue of from 5 to 50% by weight.

5. A method according to claim 1 wherein the carbonized paper particles of step (3) are thereafter impregnated a second time with the liquid carbonaceous impregnating agent and then carbonized a second time by temperature treatment.

6. A method according to claim 2 wherein the carbonized paper particles of step (3) are thereafter impregnated a second time with the liquid carbonaceous impregnating agent and then carbonized a second time by temperature treatment.

7. A method according to claim 3 wherein the carbonized paper particles of step (3) are thereafter impregnated a second time with the liquid carbonaceous impregnating agent and then carbonized a second time by temperature treatment.

8. A method according to claim 4 wherein the carbonized paper particles of step (3) are thereafter impregnated a second time with the liquid carbonaceous impregnating agent and then carbonized a second time by temperature treatment.

9. A method of claim 1 wherein the carbonized paper particles are comminuted.

10. A method of claim 2 wherein the carbonized paper particles are comminuted.

11. A method of claim 3 wherein the carbonized paper particles are comminuted.

12. A method of claim 4 wherein the carbonized paper particles are comminuted.

13. A method of claim 5 wherein the carbonized paper particles are comminuted.

14. A method of claim 6 wherein the carbonized paper particles are comminuted.

15. A method of claim 7 wherein the carbonized paper particles are comminuted.

16. A method of claim 8 wherein the carbonized paper particles are comminuted.

17. A method according to claim 3 wherein the liquid carbonaceous impregnating agent is a methanolic phenolformaldehyde resin solution.

18. A method according to claim 7 wherein the liquid carbonaceous impregnating agent is a methanolic phenolformaldehyde resin solution.

19. A method according to claim 11 wherein the liquid carbonaceous impregnating agent is a methanolic phenolformaldehyde resin solution.

20. A method according to claim 15 wherein the liquid carbonaceous impregnating agent is a methanolic phenolformaldehyde resin solution.

* * * * *